United States Patent [19]

Martin

[11] Patent Number: 5,419,682
[45] Date of Patent: May 30, 1995

[54] AXIAL FAN HAVING PLASTIC BLADES

[75] Inventor: Hans Martin, Stuttgart, Germany

[73] Assignee: Behr GmbH & Co., Stuttgart, Germany

[21] Appl. No.: 134,672

[22] Filed: Oct. 12, 1993

[30] Foreign Application Priority Data

Oct. 12, 1992 [DE] Germany ............ 42 34 292.9

[51] Int. Cl.⁶ ............................................. F04D 29/32
[52] U.S. Cl. .................. 416/144; 416/229 R; 416/241 A
[58] Field of Search ............... 416/169 A, 144, 229 R, 416/241 A

[56] References Cited

U.S. PATENT DOCUMENTS

| | | | |
|---|---|---|---|
| 2,573,875 | 11/1951 | Riddiford | 416/144 |
| 3,161,239 | 12/1964 | Andersen | 416/241 A |
| 3,749,519 | 7/1973 | Ryba | 416/241 A |
| 4,153,389 | 5/1979 | Boyd . | |
| 4,169,693 | 10/1979 | Brubaker | 416/169 A |

FOREIGN PATENT DOCUMENTS

| | | | |
|---|---|---|---|
| 2361481 | 6/1974 | Germany | 416/169 A |
| 32098 | 4/1981 | Japan | 416/241 A |
| 1418236 | 12/1975 | United Kingdom | 416/169 A |
| 1490055 | 10/1977 | United Kingdom . | |

*Primary Examiner*—Edward K. Look
*Assistant Examiner*—James A. Larson
*Attorney, Agent, or Firm*—Walter Ottesen

[57] ABSTRACT

The invention is directed to an axial fan having a hub and including an annular flange and a plurality of fan blade units distributed in spaced relationship about the periphery of the annular flange. Each of the fan blade units includes a base portion defining a hub component and a fan blade extending outwardly from the base portion. The hub components are disposed in spaced relationship one next to the other around the periphery of the annular flange to define the hub of the axial fan and so as to cause each two mutually adjacent ones of the hub components to be separated from each other and to define a gap therebetween. Each of the fan blade units is a single piece injection molded onto the annular flange.

5 Claims, 2 Drawing Sheets

AXIAL FAN HAVING PLASTIC BLADES

FIELD OF THE INVENTION

The invention relates to an axial fan having plastic blades, a plastic hub and a metal annular flange which is embedded in the plastic hub. The invention also relates to a method of making the axial fan and to a device for carrying out the method.

BACKGROUND OF THE INVENTION

An axial fan of the kind described above is disclosed in U.S. Pat. No. 4,153,389. In this axial fan, a continuous plastic hub supports the fan blades which are injection molded as one piece with the hub. A metal ring flange is embedded in the plastic hub and the fan is, for example, attached to a fluid-friction coupling with the annular flange and the fluid-friction coupling being driven by an internal combustion engine. The production of such fan wheels is very complex and expensive because a large tool is needed with which the fan is produced in an injection molding operation. The large tool corresponds to the diameter of the fan wheel. The metal annular flange is placed in the injection tool and is injection molded so as to embed the flange in the injected material. For a small number of pieces, the production of such an injection tool is too expensive so that the plastic fan cannot be economically produced in a short run production. For this reason, it is necessary to resort to other measures such as rivet-attached fan blades made of metal.

British patent publication 1,490,055 discloses a fan configuration wherein a metal annular flange is provided witch window-like recesses in which individually manufactured fan blades made of plastic are seated. A plastic hub is then injection molded so as to embed a portion of the fan blades. Three components are connected to each other with this assembly technique, namely, the metal annular flange, the plastic hub and the individual fan blades. A tool for the fan blades as well as a further tool for the plastic hub is required which still means relatively high manufacturing costs. Furthermore, the strength of the connection between the base of the blade and the hub is not adequate for higher loads.

SUMMARY OF THE INVENTION

It is an object of the invention to provide an axial fan of the kind described above which can also be produced economically in smaller numbers and especially with greatly reduced tool costs and such that greater strength is provided.

The axial fan of the invention has a hub and includes: an annular flange; a plurality of fan blade units distributed in spaced relationship about the periphery of the annular flange; each of the fan blade units including a base portion defining a hub component; the hub components being disposed in spaced relationship one next to the other around the periphery of the annular flange to define the hub of the axial fan and so as to cause each two mutually adjacent ones of the hub components to be separated from each other and to define a gap therebetween; each of the fan blade units including a fan blade extending outwardly from the base portion; and, each of the fan blade units being a single piece injection molded onto the annular flange.

According to a feature of the invention, the fan blade units are individually and sequentially injection molded onto the metal annular flange. Only one tool is necessary and is designed for one fan blade unit. Such a tool for one fan blade unit is of considerably less cost than a tool for the entire fan blade circle. The annular flange is partially enclosed and held by the injection molding tool and is successively indexed in the injection molding tool at distances corresponding to the blade spacing so that the fan blade units can be successively injection molded onto a peripheral portion of the annular flange. In this way, axial fans having plastic blades can also be produced in small numbers since the tool for a production run is considerably less expensive.

According to another feature of the invention, intermediate pieces are seated in the gaps between the hub components after the fan blade units are injection molded onto the annular flange. The intermediate pieces can, for example, be attached with a clip connection. These intermediate pieces are preferably configured so as to be advantageous for the air flow and to thereby define a complete aerodynamic hub contour. These intermediate pieces can also be interconnected on one side of the fan so that they define a closed circle.

According to another embodiment of the invention, the intermediate pieces can also be configured as compensating weights and therefore have different weights and/or sizes so that the axial fan is balanced at the same time.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
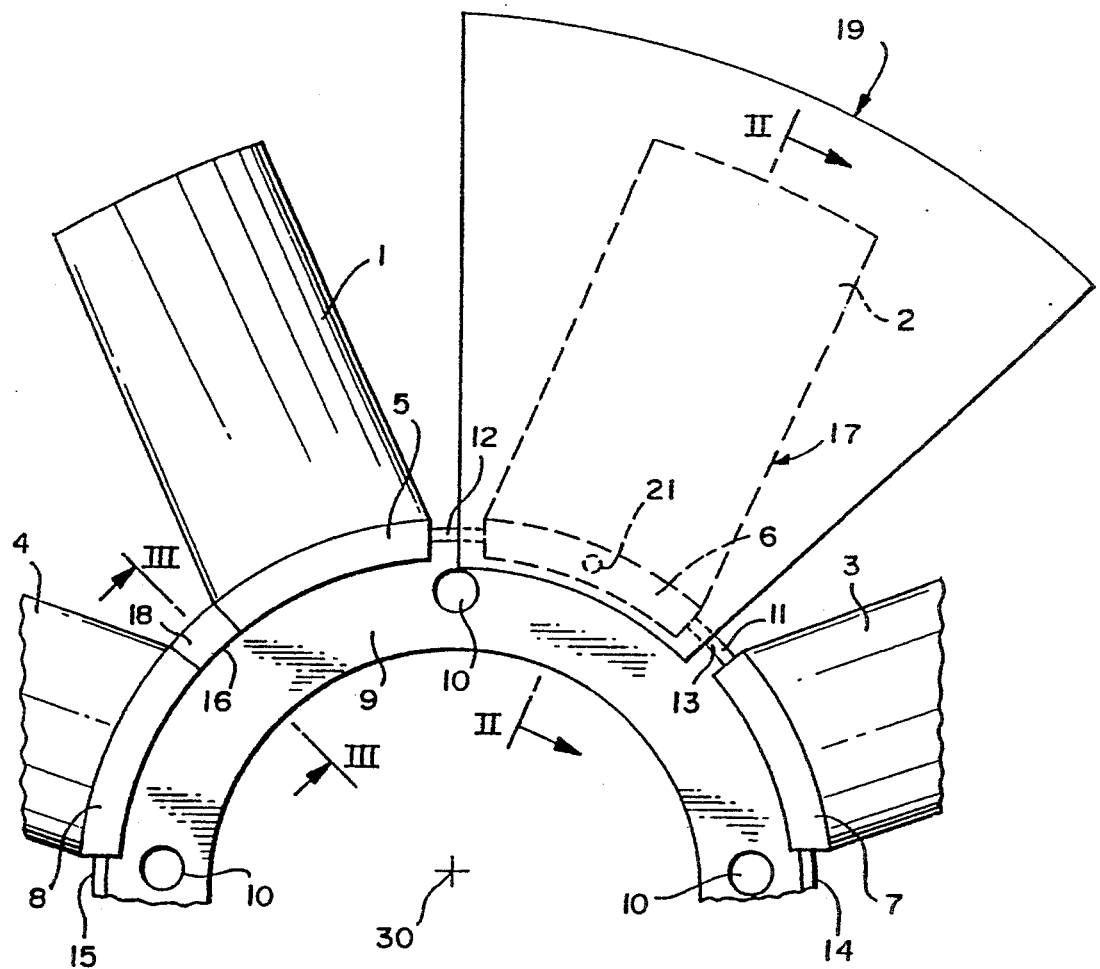
FIG. 1 is a plan view showing a portion of the axial fan including the single mold in which the fan blade units are individually and sequentially formed.

FIG. 1 shows a front view of a portion of the upper half of an axial fan with only four fan blades 1, 2, 3 and 4 being shown. The axial fan defines an axis 30 of rotation extending perpendicularly to the plane of the drawing. The fan blades are made of plastic and the remaining fan blades (not shown) are peripherally distributed in the same manner. The fan blades 1, 2, 3 and 4 have respective fan bases 5, 6, 7 and 8. The fan blade and the fan base corresponding thereto conjointly define a fan blade unit. Each of the fan bases is configured as a hub component and encloses a cylindrical portion 11 of a metal annular flange 9 having a leg 9a.

The annular flange 9 is a flanged member having a leg portion 9a and the cylindrical portion 11. The leg portion 9a and the cylindrical flange 11 conjointly impart a pot-shaped configuration to the flanged member 9. Gaps 12, 13, 14, 15 and 16 are disposed between each two mutually adjacent ones of the hub components 5, 6, 7 and 8. In these gaps, the annular flange 9 is not enclosed with injection molded material. As will be explained below, these gaps result because of how the fan wheel is made in accordance with the invention.

The gaps can later be filled with intermediate pieces as exemplified by an intermediate piece 18 in gap 16.

Such an axial fan is preferably utilized for cooling the internal combustion engine in a motor vehicle and is disposed behind the radiator. The axial fan is preferably attached to a fluid-friction coupling by means of the annular flange 9 and the bores 10. The fluid-friction coupling is driven by the engine of the motor vehicle. Reference numeral 19 identifies an injection molding tool for injection molding the fan blade units.

Figure 2:
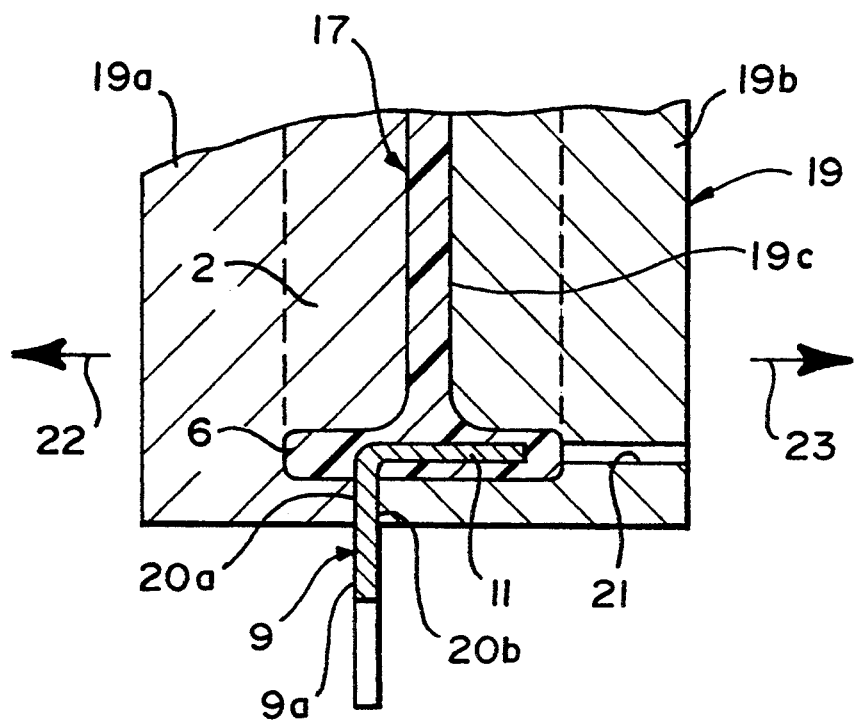
FIG. 2 is a partial section view taken along line II—II of FIG. 1.

FIG. 2 is a radial section view taken through the hub component 6 of fan blade unit 17 which shows that a segment of the cylindrical portion 11 of the annular flange 9 is completely embedded in the hub component 6. This is achieved in that the injection molding tool 19 is applied to the annular flange 9 so that both halves 19a and 19b of the injection molding tool tightly clamp the annular flange 9 at the leg 9a thereof.

The injection molding tool 19 comprises the two halves 19a and 19b which, when closed, conjointly define a partition interface extending in a plane perpendicular to the axis 30 of rotation of the axial fan. The leg 9a is clamped at respective clamping surfaces 20a and 20b of mold halves 19a and 19b which conjointly define a mold cavity 19c. The injection molding tool 19 is designed for making only one fan blade unit at a time and is shown clamped to annular flange 9 for making fan blade unit 17. After the molding tool 19 is clamped in place on the annular flange 9, the fan blade unit 17 including the fan blade 2 and fan base 6 is injection molded as an integral piece and is therefore already fixedly connected to the annular flange 9 and is in its correct position along the periphery thereof. The liquid plastic is passed into the mold cavity 19c via injection channel 21 to form fan blade unit 17. Thereafter, the injection molding tool 19 is opened by separating the two mold halves 19a and 19b as indicated by arrows 22 and 23. Then, injection molding tool 19 is displaced in the peripheral direction by an amount corresponding to the blade spacing. The injection molding tool 19 is then again clamped into place on the leg 9a of the annular flange 9 so that the next fan blade unit can be injection molded and thereby simultaneously attached to the annular flange. This procedure is repeated until all fan blade units are mounted on the peripheral portion 11 of the annular flange 9.

The gaps 12, 13, 14, 15 and 16 between the individual hub components 5, 6, 7 and 8 are produced because the annular flange is clamped at respective mutually spaced segments thereof between the two halves of the injection molding tool so that no plastic reaches the region of these gaps.

In lieu of moving the injection molding tool around the periphery of the annular flange 9, the injection molding tool can be stationary and the annular flange indexed relative thereto to sequentially form the fan blade units onto the peripheral portion 11 of the annular flange.

Figure 3:
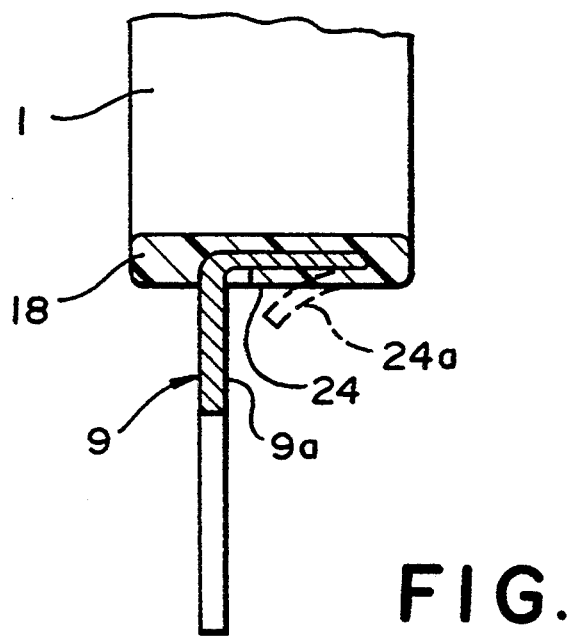
FIG. 3 is a partial section view taken along line III-—III of FIG. 1.

As shown in FIG. 3, the gaps between each two mutually adjacent ones of the base components are filled with identical intermediate pieces with intermediate piece 18 being shown in gap 16. The intermediate pieces are attached after all fan blade units are injection molded onto the annular flange 9. The intermediate pieces can be attached by means of a clip attachment as shown in FIG. 3. More specifically, the portion 24 is resilient and can be bent back as shown by phantom outline 24a in FIG. 3 to facilitate placement of the intermediate piece 18 on the cylindrical portion 11 of the annular flange 9.

Figure 4:
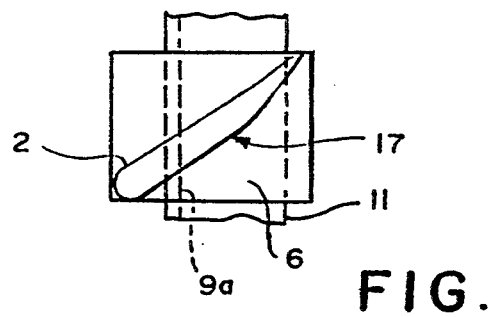
FIG. 4 is a plan view of a fan blade unit showing how the fan blade is pitched to facilitate the movement of air.

FIG. 4 is a plan view of a fan blade unit with the injection molding tool removed showing how the fan blade 2 is pitched to facilitate the movement of air.

After the intermediate pieces are in place, a hub which is advantageous to air flow is provided and presents a closed contour. The intermediate pieces can also be configured as flow directing bodies for the air flow or they can be configured as balancing weights to balance the fan.

The advantage of this method of manufacture is seen in that only a relatively small injection molding tool is necessary. This tool has essentially the dimensions of a fan blade with the fan base corresponding thereto. This substantially reduces the cost of the injection molding tool in proportion approximately to the number of blades. Nonetheless, the configuration and the other advantages of a plastic fan circle injection molded as a single piece are the same as in the fan produced according to the invention. This applies especially to the strength of the connection of the fan base to the annular flange. This method of the invention for making the axial fan is especially recommended for fans for cooling the engines of trucks and the like where the fans are relatively large and are produced in small numbers.

It is understood that the foregoing description is that of the preferred embodiments of the invention and that various changes and modifications may be made thereto without departing from the spirit and scope of the invention as defined in the appended claims.

What is claimed is:

1. An axial fan having a hub and comprising:
   an annular flange;
   a plurality of fan blade units distributed in spaced relationship about the periphery of said annular flange;
   each of said fan blade units including a base portion defining a hub component;
   the hub components being disposed in spaced relationship one next to the other around the periphery of said annular flange to define the hub of the axial fan and so as to cause each two mutually adjacent ones of said hub components to be separated from each other to define a gap therebetween;
   each of said fan blade units including a fan blade extending outwardly from said bade portion; and,
   each of said fan blade units being a single injection molded piece of plastic molded directly onto said annular flange so as to cause a portion of said annular flange to be embedded and immovable trapped within said base portion whereby said blade unit is securely attached to said annular flange.

2. The axial fan of claim 1, said annular flange being made of metal.

3. An axial fan having a hub and comprising:
   an annular flange;
   a plurality of fan blade units distributed in spaced relationship about the periphery of said annular flange;
   each of said fan blade units including a base portion defining a hub component;
   the hub components being disposed in spaced relationship one next to the other around the periphery of said annular flange to define the hub of the axial fan and so as to cause each two mutually adjacent ones of said hub components to be separated from each other to define a gap therebetween;
   each of said fan blade units including a fan blade extending outwardly from said base portion;

each of said fan blade units being a single piece injection molded onto said annular flange;

said fan blade units being made of plastic and said annular flange being made of metal; and, said annular flange having an outer radial region and being a flanged member having a leg portion and a cylindrical flange in said outer radial region; said leg portion and said cylindrical flange cojointly imparting a pot-shaped configuration to said flanged member; and, said fan blade units being injection molded onto said cylindrical flange so as to embed said cylindrical flange in said base portion.

4. The axial fan of claim 1, further comprising a plurality of intermediate pieces for filling out respective ones of the gaps defined by said fan blade units.

5. An axial fan having a hub and comprising:
an annular flange;
a plurality of fan blade units distributed in spaced relationship about the periphery of said annular flange;
each of said fan blade units including a base portion defining a hub component;
the hub components being disposed in spaced relationship one next to the other around the periphery of said annular flange to define the hub of the axial fan and so as to cause each two mutually adjacent ones of said hub components to be separated from each other to define a gap therebetween;
each of said fan blade units including a fan blade extending outwardly from said base portion;
each of said fan blade units being a single piece injection molded onto said annular flange;
a plurality of intermediate pieces for filling out respective ones of the gaps defined by said fan blade units; and,
said intermediate pieces being a plurality of balancing clamps having different weights.

* * * * *

UNITED STATES PATENT AND TRADEMARK OFFICE
CERTIFICATE OF CORRECTION

PATENT NO. : 5,419,682
DATED : May 30, 1995
INVENTOR(S) : Hans Martin

It is certified that error appears in the above-indentified patent and that said Letters Patent is hereby corrected as shown below:

In column 1, line 34: delete "witch" and substitute -- with -- therefor.

In column 4, line 49: delete "immovable" and substitute -- immovably -- therefor.

Signed and Sealed this

Eighteenth Day of July, 1995

Attest:

BRUCE LEHMAN

*Attesting Officer*     *Commissioner of Patents and Trademarks*